(12) United States Patent
Colugnati

(10) Patent No.: US 11,573,057 B2
(45) Date of Patent: Feb. 7, 2023

(54) HEAT EXCHANGER AND CORRESPONDING PRODUCTION METHOD

(71) Applicant: C.G.A. TECHNOLOGIES S.R.L., Cividale del Friuli (IT)

(72) Inventor: Giorgio Colugnati, Romans d'Isonzo (IT)

(73) Assignee: C.G.A. TECHNOLOGIES S.R.L., Cividale del Friuli (IT)

( * ) Notice: Subject to any disclaimer, the term of this patent is extended or adjusted under 35 U.S.C. 154(b) by 0 days.

(21) Appl. No.: 17/274,235

(22) PCT Filed: Aug. 8, 2019

(86) PCT No.: PCT/IT2019/050183
§ 371 (c)(1),
(2) Date: Mar. 8, 2021

(87) PCT Pub. No.: WO2020/031221
PCT Pub. Date: Feb. 13, 2020

(65) Prior Publication Data
US 2021/0270546 A1   Sep. 2, 2021

(30) Foreign Application Priority Data
Aug. 9, 2018   (IT) .................. 102018000008013

(51) Int. Cl.
| F28F 3/14 | (2006.01) |
| B23P 15/26 | (2006.01) |
| F28D 1/03 | (2006.01) |
| F28F 9/02 | (2006.01) |
| F28F 9/26 | (2006.01) |

(52) U.S. Cl.
CPC ............... *F28F 3/14* (2013.01); *B23P 15/26* (2013.01); *F28D 1/0325* (2013.01); *F28F 9/0248* (2013.01); *F28F 9/264* (2013.01); *F28F 2210/02* (2013.01)

(58) Field of Classification Search
CPC .. F28F 3/14; F28F 9/0248; F28F 9/264; F28F 2210/02; F28D 1/0325
See application file for complete search history.

(56) References Cited

U.S. PATENT DOCUMENTS

| 6,896,298 B2 * | 5/2005 | Walterscheid ........ F28F 9/0248 285/205 |
| 10,962,309 B2 * | 3/2021 | Takagi ............... H05K 7/20272 |
| 2002/0033410 A1 | 3/2002 | Dziadosz et al. |

(Continued)

FOREIGN PATENT DOCUMENTS

| EP | 1178268 | 2/2002 |
| WO | 2014154883 | 10/2014 |
| WO | 2017190253 | 11/2017 |

OTHER PUBLICATIONS

International Search Report and Written Opinion of PCT/IT2019/050183 dated Nov. 20, 2019, 11 pages.

*Primary Examiner* — Jon T. Schermerhorn, Jr.
(74) *Attorney, Agent, or Firm* — Rankin, Hill & Clark LLP

(57) ABSTRACT

Heat exchanger comprising at least a first plate (11) and at least a second plate (12) overlapping and reciprocally joined to each other in correspondence with respective coupling surfaces (13).
Between the coupling surfaces (13), at least one passage channel (14) for a heat-carrying fluid is made, by deforming at least one of the two plates (11, 12).

11 Claims, 2 Drawing Sheets

(56) References Cited

U.S. PATENT DOCUMENTS

2004/0188078 A1* 9/2004 Wu .................. F28D 1/0325
  165/183
2008/0250813 A1  10/2008 Godin
2013/0032319 A1   2/2013 Kinder et al.
2014/0224452 A1   8/2014 Abels
2019/0366876 A1* 12/2019 Cheadle .............. B60L 50/64

* cited by examiner (STATE OF THE ART)

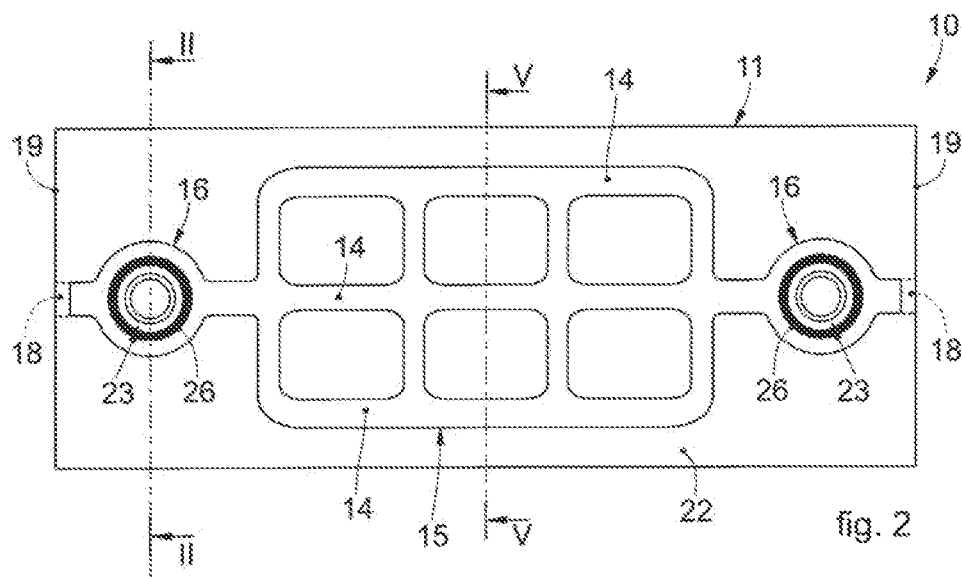
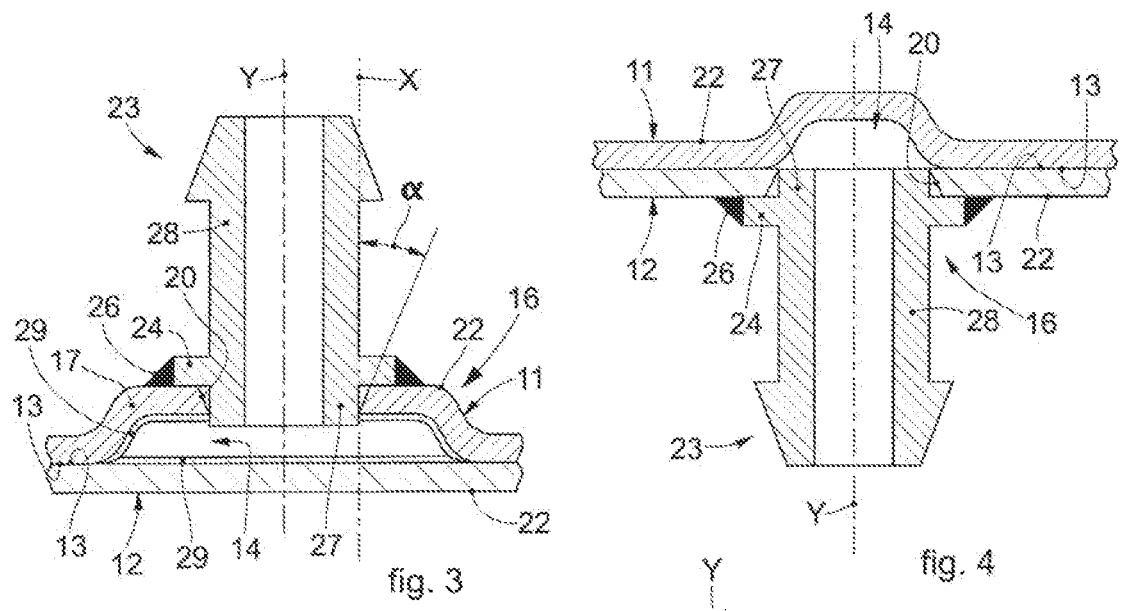
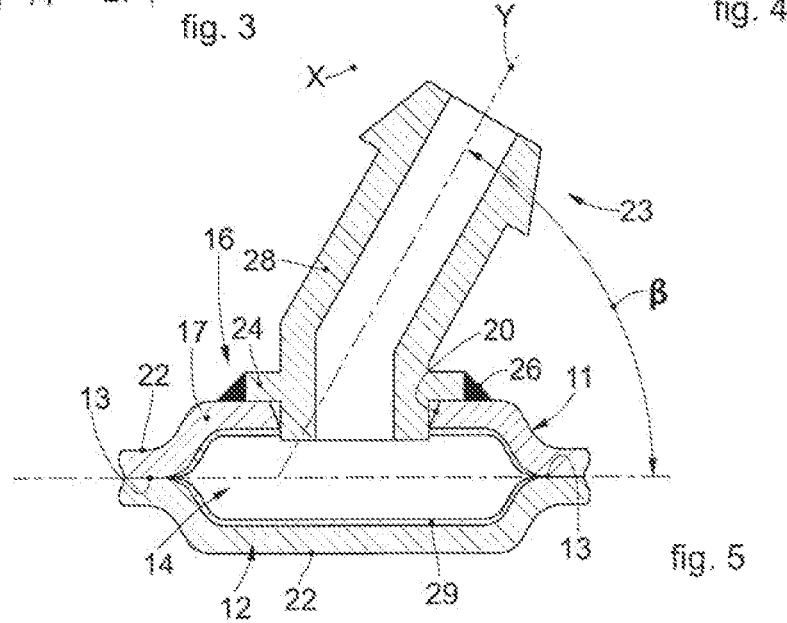

HEAT EXCHANGER AND CORRESPONDING PRODUCTION METHOD

FIELD OF THE INVENTION

The present invention concerns a heat exchanger and the corresponding production method.

In particular, the invention concerns a plate-type heat exchanger, or rather a heat exchanger made with two or more plates overlapping and joined together, inside which a heat-carrying fluid is made to flow.

More in particular, embodiments described here concern a heat exchanger provided with an innovative supply mode for the heat-carrying fluid.

BACKGROUND OF THE INVENTION

Plate-type heat exchangers used, for example, as refrigerating or evaporator plates are known, inside which a heat-carrying fluid, gaseous or liquid, is made to pass.

Compared to other types, plate-type heat exchangers have a reduced thickness, a large heat exchange surface, a better heat exchange coefficient, as well as simplified maintenance operations, in order to satisfy particular application requirements from the point of view of sizes, costs and practicalities.

These known heat exchangers, an example of which is shown in the attached FIG. 1, comprise two or more plates 101 overlapping and joined to each other by means of heating and/or rolling methods, that is, by means of the technique also known as "Roll Bond", an example of which is described in document U.S. Pat. No. 2,690,002.

This production technique provides that detaching material 102 is deposited on at least one of the two plates 101 to be joined according to a predefined pattern coordinated with the shape of passage channels 103 to be obtained, in order to define the transit circuit of the heat-carrying fluid. The detaching material 102 is deposited starting from at least one peripheral edge 104 of the two plates 101.

Subsequently, the two plates 101 are made to overlap each other and to pass through at least one pair of rolling rolls/cylinders. Before and/or during rolling, the two plates are also heated to a temperature lower than their melting temperature.

The rolling action allows to weld the two plates together on the entire surface of reciprocal contact, except for the surface portions affected by the detaching material.

Subsequently, in proximity to at least one peripheral edge 104 of the plates 101, and where a portion of detaching material 102 is present, at least one slit 105 is made between the two plates 101 suitable to house a device to deliver compressed air. The pressure of the air that is delivered has to be high enough to deform at least one of the two plates, in correspondence with the detaching material 102 and along the entire deposition path thereof. The deformation of at least one of the two plates 101 therefore allows to define the channels 103 intended for the passage of the heat-carrying fluid.

Furthermore, in order to allow the circulation of the heat-carrying fluid in the passage channels 103 defined above, it is known to make, on at least one of the lateral edges 104, at least one entry aperture and one exit aperture of the heat-carrying fluid. These entry and exit apertures, or at least one of them, can correspond substantially to the slit 105. Alternatively, the entry and exit apertures of the heat-carrying fluid are also obtained by depositing, before the rolling and in the desired position, the detaching material which subsequently, by deformation of at least one of the plates 101, allows to obtain the apertures.

Connection elements 106 are then associated to the apertures, for example by welding.

This mode of connecting the connection elements 106 in proximity to the peripheral edge 104 significantly limits the diameter that the connection elements can have, since they have be welded on the perimeter edge of the heat exchanger, or rather, this perimeter edge does not offer a large welding area and therefore cannot guarantee an adequate stability. Consequently, this limits the quantity of heat-carrying fluid that can be introduced into the heat exchanger, limiting the performance indexes thereof.

Furthermore, the particular mode of axial feed, substantially coplanar to the plates 101, of the heat-carrying fluid limits the flexibility of installation of the heat exchanger, since for some applications the presence of connection elements in proximity to the peripheral edges can be an obstacle to the installation.

There is therefore a need to perfect a heat exchanger, in particular a plate-type heat exchanger of the Roll-bond type, which can overcome at least one of the disadvantages of the state of the art.

In particular, the need is felt to provide a heat exchanger of the Roll-bond type that offers a solution that is effective, structurally stable and versatile with respect to the needs above.

US 2013/032319, WO 2014/154883, WO 217/190253 and US 2014/224452 all concern conventional plate-type heat exchangers, in which the individual plates and corresponding holes are obtained separately, for example by molding, therefore the application of possible connectors can occur at any step of the assembly procedure without involving particular production problems.

It is therefore a purpose of the present invention to provide a plate-type heat exchanger of the Roll-bond type which is particularly effective and versatile.

It is also a purpose of the invention to provide a heat exchanger in which the position of the connection elements is not constrained to the perimeter edges of the plates.

Furthermore, it is also a purpose of the present invention to provide a Roll-bond type heat exchanger which has higher performances than known solutions, in particular which offers improvements from the point of view of the heat exchange, of the feed of the heat-carrying fluid and the stability of the welds.

It is also a purpose of the present invention to reduce the load losses during the feed of the heat-carrying fluid into the heat exchanger.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a heat exchanger according to the present invention comprises at least two plates overlapping and joined to each other in correspondence with respective coupling surfaces using the technology known as Roll-bond.

Between the coupling surfaces, at least one passage channel for a heat-carrying fluid is made, by deforming at least one of the plates.

According to a characteristic aspect of the present invention, the heat exchanger comprises at least one hole made through, through only one of the plates in order to intercept the channel.

The invention therefore provides to modify the known process to produce Roll-bond panels since the drilling of only one of the two plates occurs when the two plates that form inside them the passage channels for the coolant are already coupled together.

In a first embodiment, the drilling process can combine the action of a channeling insert with a punching system able to perform a drilling operation on the channel itself, or on the opposite surface, which has no work residues.

Alternatively, the drilling process can be performed by laser cutting.

Once the hole has been made on one of the plates that make up the Roll-bond panel, it is provided to apply a tubular connection element on the hole, which is connected to the hole in an angled direction with respect to the plates to allow the passage of the heat-carrying fluid through the channel.

This embodiment of the exchanger allows to increase the connection efficiency of the connection element to the plates, and also to increase the sizes of the useful sections for the passage of the heat-carrying fluid.

It is also an advantage of the present embodiment to allow to position the connection elements in desired and determinate positions in relation to the specific production needs.

The present invention also concerns a method to produce a heat exchanger which provides to supply at least two plates, to overlap and join them to each other in correspondence with respective coupling surfaces, and subsequently to obtain at least one passage channel for a heat-carrying fluid, by deforming at least one of the plates and between the coupling surfaces.

In accordance with one aspect of the invention, the method comprises producing a through hole through one of the plates to intercept the channel, and connecting to the hole a tubular connection element located in an angled direction with respect to the plates, in order to allow the passage of the heat-carrying fluid.

BRIEF DESCRIPTION OF THE DRAWINGS

These and other characteristics of the present invention will become apparent from the following description of some embodiments, given as a non-restrictive example with reference to the attached drawings wherein:

FIG. 2 is a plan view from above of a heat exchanger in accordance with the present invention;

FIG. 3 is a section along the line III-III of FIG. 2;

FIG. 4 is a variant of FIG. 3;

FIG. 5 is a variant of FIG. 3;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
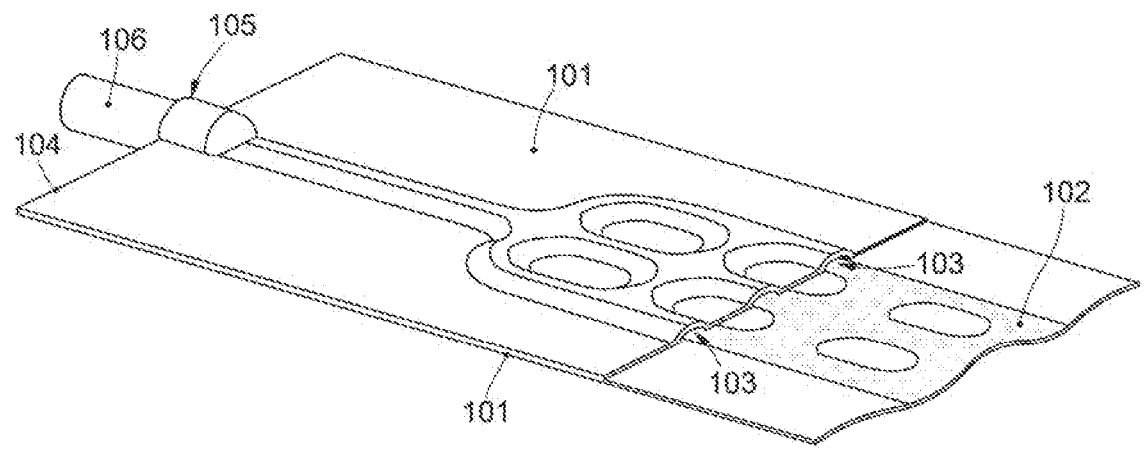
FIG. 1 is a perspective view of a known plate-type heat exchanger, in accordance with the state of the art.

With reference to the attached drawings 2-6, the present invention concerns a heat exchanger, indicated as a whole with reference number 10.

The heat exchanger 10 in accordance with the present invention comprises at least a first plate 11 and a second plate 12 overlapping and joined to each other in correspondence with respective coupling surfaces 13.

The plates 11, 12 have a substantially flat development, with a substantially uniform thickness.

The plates 11, 12 can both have the same thickness or can have a different thickness.

The first plate 11 and the second plate 12 are made of a material having a low thermal resistance, for example an aluminum alloy. In particular, the choice of the material also depends on the chemical compatibility and resistance when coming into contact with various heat-carrying fluids, or better, it is a function of the resistance to corrosion with respect thereto.

Between the coupling surfaces 13, at least one passage channel 14 for a heat-carrying fluid is made, by deforming at least one of the plates 11, 12 and as described below.

Figure 6:
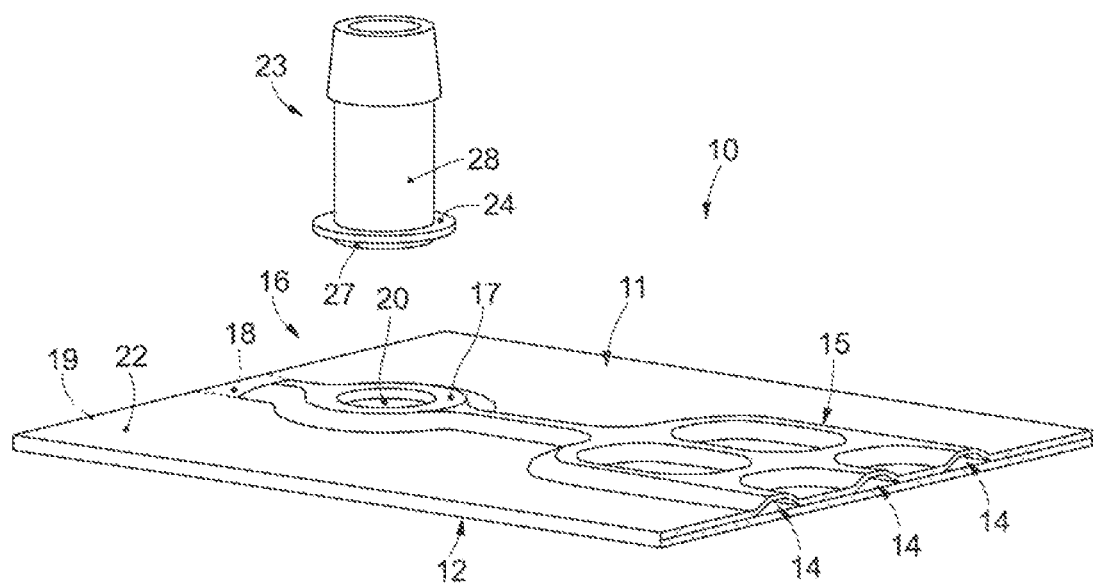
FIG. 6 is a perspective view of a section along the line VI-VI of FIG. 2.

In accordance with some embodiments of the invention (FIGS. 2 and 6), the heat exchanger 10 can be provided with a plurality of channels 14 suitably distributed in the surface development of the plates 11, 12, fluidically connected to each other, to define a network 15 of channels 14. The network 15 of channels 14 can therefore be uniformly distributed on at least part of the surface of the plates 11, 12, in order to obtain a larger area designated for heat exchange, as well as to maximize the overall heat exchange coefficient of the heat exchanger 10.

The network 15 of channels 14 can have different configurations, for example defined by a plurality of channels 14 which intersect each other with rectilinear segments, curved segments, or mixed rectilinear and curved segments.

According to some embodiments, the channels 14 are defined by portions of plate 11, 12, or by portions of plates, which are protruding, that is in relief, with respect to the substantially flat development of the plates 11, 12 themselves, that is, with respect to the coupling surfaces 13.

These protruding portions of the plates 11, 12 can be made on only one of the two plates 11, 12 (FIGS. 3, 4 and 6) defining a heat exchanger 10 of the "One Side Flat" type. Variant of embodiments provide that the protruding portions are made on both plates 11, 12 (FIG. 5) defining a heat exchanger 10 of the "Double Side Inflated" type.

By way of example only, the channels 14 can have a cross-section that can vary indicatively from 1 $mm^2$ to 20 $mm^2$, as a function of the particular application to which the heat exchanger 10 is subjected.

In accordance with a possible solution, the internal surfaces of the channels 14 can be coated with a coating material 29 with the function of protection against corrosion.

The coating material 29 can be functional to the method to produce the heat exchanger 10, as described below.

The coating material 29 can be made from the same product used as a detaching agent.

In accordance with one aspect of the present invention, the heat exchanger 10 comprises at least one hole 20 made through one of the plates 11, 12 to intercept at least one channel 14.

According to a preferred solution, the hole 20 is made through only one of the two plates 11, 12, leaving the other plate intact and free of shearing or drilling.

The hole 20 therefore defines, in at least one of the plates 11, 12, a feed or discharge zone 16 of the heat-carrying fluid into/from the channels 14.

The hole 20 can have a circular conformation, although other shapes, for example polygonal, or mixed polygonal and curved, are not excluded.

In a completely innovative way compared to the usual Roll-bond technology, the hole 20 can be obtained, on one of the two plates, with laser cutting technology since this technology guarantees a high degree of precision, avoiding the formation of shavings that can get stuck in the channels 14.

In accordance with one embodiment (FIG. 2), the heat exchanger 10 is provided with at least two holes 20, one of which defines the feed zone, while the other defines the discharge zone of the heat-carrying fluid.

According to a possible embodiment, the hole 20 has a flared shape with an angle of flare that opens toward the outside.

The flared shape prevents the portion that is removed during cutting from falling into the channels 14 of the heat exchanger 10.

According to a possible solution, the hole 20 has an angle of flare α comprised between 1° and 45°, preferably between 1° and 10°, with respect to an axis X orthogonal to the flat development of the plates 11, 12.

According to some embodiments of the present invention (FIGS. 3, 5 and 6), the feed or discharge zone 16, where the hole 20 is present, is made on a deformed portion 17 of one of the plates 11, 12.

The deformed portion 17 is made in relief with respect to the substantially flat development of one of the plates 11, 12.

The deformed portion 17 defines an end part of the channels 14, that is, for the introduction or discharge of the heat-carrying fluid.

The deformed portion 17 can have a ring shape, and the hole 20 is made thereon.

In accordance with further embodiments of the invention, as shown for example in FIG. 4, the hole 20, or the holes 20, can be made on a flat, or not deformed, portion of one of the plates 11, 12.

In another embodiment, the hole 20 can be obtained with an alternative method which guarantees a high degree of precision, avoiding the formation of shavings that can get stuck in the channels 14. This method provides to insert a suitably shaped insert in the channels in correspondence with the perimeter of the plate, followed by the activation of a punch perpendicular to the insert that performs the drilling by shearing. This technology is also completely innovative with respect to the standard production process of Roll-Bond exchangers.

Moreover, the heat exchanger 10 comprises a tubular connection element 23 which is connected to the hole 20 in an angled direction Y with respect to the flat development of the plates 11, 12, in order to allow the passage of the heat-carrying fluid, for example for the introduction or the discharge of the latter from the channels 14.

The connection element 23 can be connected to one of the plates 11, 12 by welding, that is, by making a welding bead 26 between the connection element 23 and one of the plates 11, 12.

By way of example only, the welding can be of the TIG, MIG, or MAG type or made with LASER.

According to a variant embodiment, the connection element 23 can be connected to one of the plates 11, 12 by gluing or brazing.

In fact, entry or exit channels of the heat-carrying fluid can be connected to the connection element 23.

The connection element 23 can be defined by a tubular body 28 provided at one end with a peripheral edge 24 of larger size than the tubular body 28 which, during use, is positioned resting on the external surface 22 of one of the two plates 11, 12.

The presence of the peripheral edge 24, with a substantially annular shape, allows to increase the interface zone with the plates 11, 12 and therefore increases the resistance of the grip of the connection element 23 on the plates 11, 12.

According to a possible solution, the welding bead 26 can be made between the peripheral edge 24 and one of the plates 11, 12.

According to a possible solution, the tubular body 28 is provided with an introduction portion 27, made protruding with respect to the peripheral edge 24, which is positioned, during use, at least partially inside the channel 14, or at least in the thickness of the plate 11, 12, that defines the hole 20.

The connection element 23 can be provided with a free terminal end which can be suitably shaped in order to allow the connection operations to other pipes.

The connection element 23 has an oblong development which develops along the direction Y.

In accordance with a possible solution, the direction Y can be substantially orthogonal to the flat development of the plates 11, 12, that is, form an angle of 90° with respect to the lying plane of the plates 11, 12.

According to a variant embodiment, the direction Y can be angled by an angle of inclination β with respect to the lying plane of the plates 11, 12, which is comprised between 45° and 135°.

The present invention also concerns a method to produce a heat exchanger 10 in accordance with the present invention.

According to a possible solution of the invention, the heat exchanger 10 can be provided with an occluded channel portion 18 obtained by deforming the protruding parts which define the at least one channel 14.

The occluded channel portion 18 can be made by pinching and possible closing with sealing elements, such as sealing resins, or welding, of the plates 11, 12 with different known technologies.

The occluded channel portion 18 can be made in correspondence with a perimeter edge 19 of the heat exchanger 10. The occluded channel portion 18 can be functional to the production method of the heat exchanger 10, as described below.

In accordance with a further solution, the occluded channel portion 18 can be made in correspondence with the feed or discharge zone 16 of the cooling liquid.

Embodiments of the present invention also concern a method to make a heat exchanger 10 as described above.

The method initially provides to adequately treat at least the coupling surfaces 13 of the plates 11, 12 with solvents and/or mechanical actions (brushes) in order to remove layers of oxide, impurities or foreign substances.

Subsequently, on at least one of the coupling surfaces 13 of the plates 11, 12, preferably on both, a detaching material is deposited, which corresponds substantially with the coating material 29 of the channels 14 defined above.

The detaching material is deposited on the coupling surfaces 13 according to a pattern coordinated with the positioning pattern of the channels 14.

In accordance with a possible solution, the detaching material is deposited by means of printing techniques.

Subsequently, the plates 11, 12 are made to overlap with each other with their coupling surfaces 13, heated and made to pass through rolling rolls in order to obtain the joining of the two plates 11, 12.

By way of example only, it can be provided to reciprocally join the plates 11, 12 together in correspondence with their coupling surfaces 13 by means of the Roll Bond technique.

Specifically, the plates 11, 12 are joined along their entire coupling surface 13, except in the surface portions where the detaching material has previously been deposited.

Subsequently, it is provided to produce one or more channels 14 for the passage of the heat-carrying fluid. In order to produce these channels 14, a slit is made on the perimeter edge 19 of the heat exchanger 10 and in correspondence with the detaching material.

The slit is suitable to house a device to deliver compressed air, configured to introduce pressurized air between the two plates. The air pressure is such as to deform at least one of the two plates, along the entire path along which the detaching material has been deposited, defining the channels 14.

The detaching material previously deposited is on the internal surface of the channels 14 and therefore defines a coating thereon against corrosion.

The slit used to form the channels 14 can be closed, with sealant and/or by pinching, defining the occluded channel portion 18.

Subsequently, one or more through holes 20 are made through one of the two plates 11, 12. It is then provided to insert part of the connection element 23 into the hole 20.

Finally, the connection elements 23 are firmly attached to the external surface 22 of one of the plates 11, 12 on which their perimeter edge 24 rests.

It is clear that modifications and/or additions of parts may be made to the heat exchanger 10 as described heretofore, without departing from the field and scope of the present invention.

It is also clear that, although the present invention has been described with reference to some specific examples, a person of skill in the art shall certainly be able to achieve many other equivalent forms of heat exchanger 10, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. Heat exchanger comprising at least two plates overlapping and reciprocally roll-bonded to each other in correspondence with respective coupling surfaces, wherein at least one of said joined plates is deformed to define, between said coupling surfaces, at least one passage channel for a heat-carrying fluid, wherein at least one hole is made through one of said joined plates to intercept said channel, and a tubular connection element which is connected to said hole in an angled direction with respect to said joined plates to allow the passage of said heat-carrying fluid through said channel, wherein said hole is made through only one of said plates, wherein said connection element is defined by a tubular body provided at one end with a peripheral edge of larger size than said tubular body, and wherein said peripheral edge is positioned resting on an external surface of one of said plates.

2. Heat exchanger as in claim 1, wherein the angle formed between said connection element and a lying plane of said plates is comprised between 45° and +135°.

3. Heat exchanger as in claim 1, wherein the angle formed between said connection element and a lying plane of said plates is 90°.

4. Heat exchanger as in claim 1, wherein said hole has a flared shape with an angle of flare that opens toward the outside.

5. Heat exchanger as in claim 1, wherein it is provided with a plurality of channels suitably distributed in the surface development of the plates, fluidically connected to each other, to define a network of channels.

6. Heat exchanger as in claim 1, wherein said hole defines, in said one plate, a feed or discharge zone of the heat-carrying fluid in the at least one channel, and wherein the feed or discharge zone is made on a deformed portion of one of the plates and in relief with respect to a flat development of one of the plates.

7. Heat exchanger as in claim 1, wherein it is provided with an occluded channel portion obtained by deforming protruding parts which define the at least one channel, and wherein said occluded channel portion is made in correspondence with a perimeter edge of the heat exchanger.

8. Heat exchanger as in claim 1, wherein the internal surfaces of the at least one channel are coated with a coating material with the function of protection against corrosion.

9. Method to produce a heat exchanger according to claim 1, the method comprising:
supplying said at least two plates,
overlapping said at least two plates,
reciprocally roll-bonding said at least two plates in correspondence with the respective coupling surfaces,
subsequently deforming at least one of said joined plates to obtain at least one passage channel for a heat-carrying fluid,
making a through hole through only one of said joined plates to intercept said channel, and connecting to said hole a tubular connection element located in an angled direction with respect to said joined plates, to allow the passage of said heat-carrying fluid, and
defining said connection element by a tubular body provided at one end with a peripheral edge of larger size than said tubular body, and positionally resting said peripheral edge on an external surface of one of said plates.

10. Production method as in claim 9, wherein said hole is made by means of laser cutting technology.

11. Production method as in claim 9, wherein said hole is made by inserting an insert in at least one channel in correspondence with the perimeter of the plate, followed by the activation of a punch perpendicular to the insert that performs the drilling operation by means of shearing.

* * * * *